United States Patent
Hong et al.

(10) Patent No.: US 10,681,517 B2
(45) Date of Patent: *Jun. 9, 2020

(54) ELECTRONIC DEVICE AND COMMUNICATION CONNECTING METHOD THEREOF

(71) Applicant: Samsung Electronics Co., Ltd., Suwon-si, Gyeonggi-do (KR)

(72) Inventors: Ji-Seon Hong, Suwon-si (KR); Veerabhadrappa Chilakanti, Suwon-si (KR); Jun-Sik Kwon, Yongin-si (KR); Joo-Hyung Lee, Seoul (KR); Eui-Bum Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

This patent is subject to a terminal disclaimer.

(21) Appl. No.: 15/993,256

(22) Filed: May 30, 2018

(65) Prior Publication Data
US 2018/0279103 A1    Sep. 27, 2018

Related U.S. Application Data

(63) Continuation of application No. 14/916,106, filed as application No. PCT/KR2014/008068 on Aug. 29, 2014, now Pat. No. 10,021,510.

(30) Foreign Application Priority Data

Sep. 2, 2013 (KR) .................. 10-2013-0104845

(51) Int. Cl.
*H04W 4/80*    (2018.01)
*H04B 17/318*    (2015.01)
(Continued)

(52) U.S. Cl.
CPC ............ *H04W 4/80* (2018.02); *H04B 17/318* (2015.01); *H04W 76/18* (2018.02); *H04W 76/19* (2018.02);
(Continued)

(58) Field of Classification Search
CPC combination set(s) only.
See application file for complete search history.

(56) References Cited

U.S. PATENT DOCUMENTS 6,901,276 B1 * 5/2005 Skinner ................. H04W 48/16
  455/574
8,644,218 B1 * 2/2014 Pankajakshan ..... H04L 65/1016
  370/328

(Continued)

FOREIGN PATENT DOCUMENTS

CN    102224751 A    10/2011
CN    102857610 A    1/2013
(Continued)

OTHER PUBLICATIONS

Bluetooth Sig: "Bluetooth Specification, Version 4.0",• Jun. 30, 2010 (Jun. 30, 2010), XP055574833, Retrieved from the Internet: URL:https://www.bluetooth.com/specificatio ns/archived-specifications [retrieved on Mar. 27, 2019] * [vol. I, Part A, section 1]; [vol. I, Part A, section 1.1-1.2]; [vol. 2, Part B, section 3.1]; [vol. 2, Part E, section 7.8.5] *.
(Continued)

*Primary Examiner* — Yuwen Pan
*Assistant Examiner* — Erica L Fleming-Hall
(74) *Attorney, Agent, or Firm* — Jefferson IP Law, LLP

(57) ABSTRACT

An electronic device is provided. The electronic device includes a first local area communication part configured to perform a first local area communication, a second local area communication part configured to perform a second local
(Continued)

area communication at a lower power than the first local area communication part, and a control part configured to connect the first local area communication to other electronic devices by using the second local area communication part, wherein the second local area communication part may be configured to try a second local area communication with the other electronic devices after the connected first local area communication is disconnected.

23 Claims, 12 Drawing Sheets

(51) Int. Cl.
   *H04W 76/19* (2018.01)
   *H04W 76/18* (2018.01)
   *H04W 88/06* (2009.01)
(52) U.S. Cl.
   CPC ........... *H04W 88/06* (2013.01); *Y02D 70/142* (2018.01); *Y02D 70/144* (2018.01); *Y02D 70/164* (2018.01); *Y02D 70/168* (2018.01); *Y02D 70/26* (2018.01)

(56) References Cited

U.S. PATENT DOCUMENTS

| | | | | |
|---|---|---|---|---|
| 2002/0114288 A1* | 8/2002 | Soliman | .............. | H04W 72/085 370/310 |
| 2002/0123345 A1* | 9/2002 | Mahany | ................ | H04W 48/08 455/432.1 |
| 2004/0198366 A1* | 10/2004 | Crocker | ................ | H04W 76/19 455/452.1 |
| 2004/0266494 A1* | 12/2004 | Ruuska | ............. | H04W 52/0216 455/574 |
| 2005/0058107 A1* | 3/2005 | Salokannel | .......... | H04B 1/7183 370/338 |
| 2010/0099359 A1* | 4/2010 | Lee | .......... | H04L 65/80 455/41.3 |
| 2010/0124196 A1 | 5/2010 | Bonar et al. | | |
| 2010/0317289 A1* | 12/2010 | Desai | .................. | H04B 17/318 455/41.2 |
| 2012/0169932 A1* | 7/2012 | Kim | ........................ | G08C 17/02 348/563 |
| 2013/0005260 A1* | 1/2013 | Hosono | .................. | H04W 76/36 455/41.2 |
| 2013/0039239 A1* | 2/2013 | Lin | .................... | H04W 52/0229 370/311 |
| 2013/0143518 A1* | 6/2013 | Singer | ..................... | H04W 4/90 455/404.2 |
| 2014/0241187 A1* | 8/2014 | Barkay | ................. | H04W 76/23 370/252 |
| 2014/0315491 A1* | 10/2014 | Preiszler | ........... | H04W 52/0235 455/41.2 |
| 2014/0342670 A1* | 11/2014 | Kang | .................... | H04W 24/08 455/41.2 |
| 2015/0024786 A1* | 1/2015 | Asrani | .................. | H04W 4/023 455/456.4 |
| 2015/0103708 A1* | 4/2015 | Kang | ................ | H04W 72/0433 370/311 |
| 2015/0230285 A1* | 8/2015 | Park | .................... | H04W 76/028 455/41.2 |
| 2016/0088455 A1* | 3/2016 | Bozik | ..................... | H04W 4/90 370/225 |
| 2016/0127308 A1* | 5/2016 | Yu | ..................... | H04W 52/0235 709/219 |
| 2016/0192429 A1* | 6/2016 | Nogawa | ................ | H04W 8/005 370/329 |

FOREIGN PATENT DOCUMENTS

| | | |
|---|---|---|
| EP | 2 472 892 A1 | 7/2012 |
| KR | 10-2005-0027022 A | 3/2005 |
| KR | 10-2012-0004951 A | 1/2012 |
| KR | 10-2012-0078066 A | 7/2012 |
| WO | 2013/100994 A1 | 7/2013 |

OTHER PUBLICATIONS

European Search Report dated Apr. 17, 2019, issued in European Patent Application No. 19150841.5.

\* cited by examiner

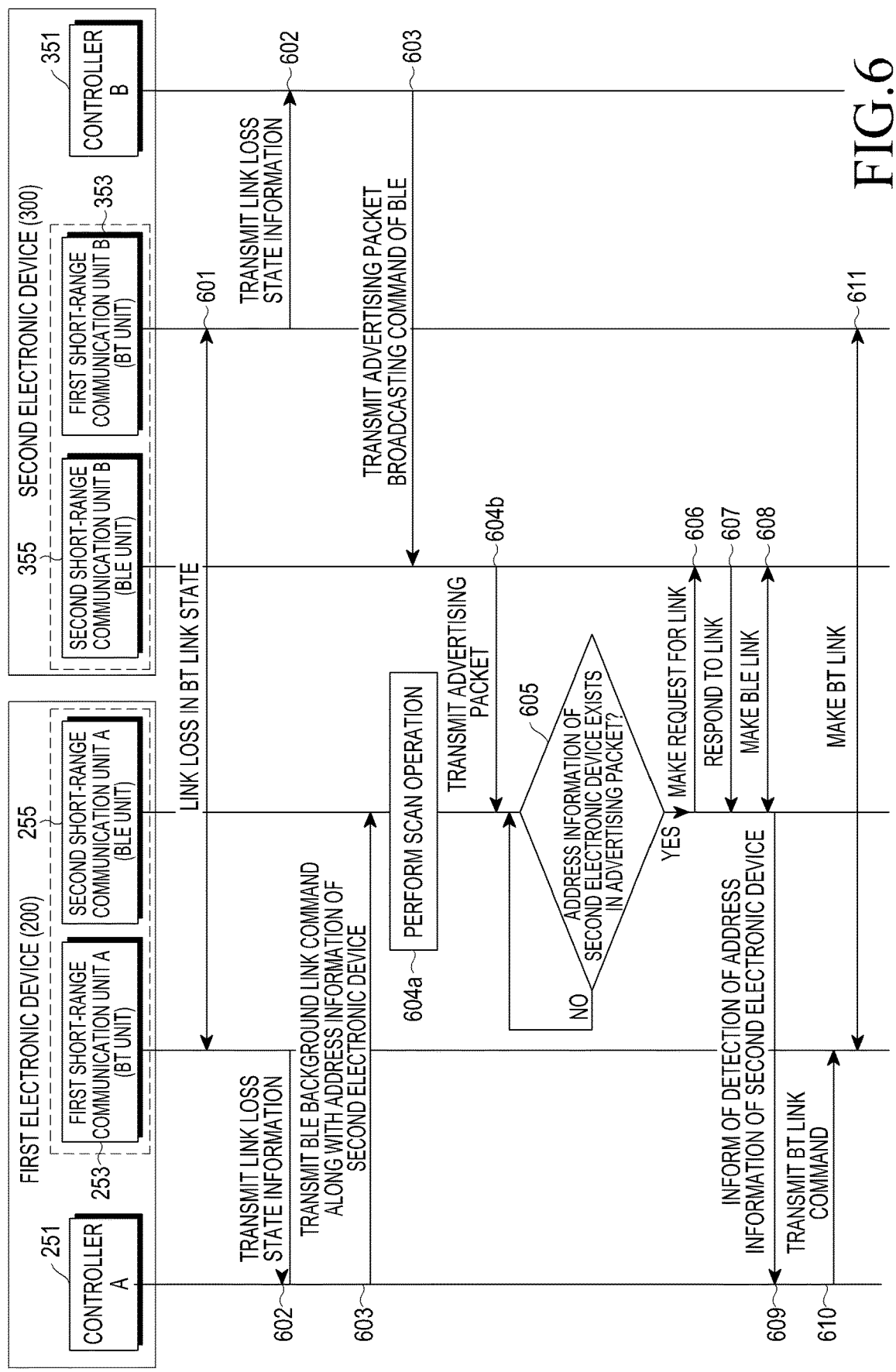

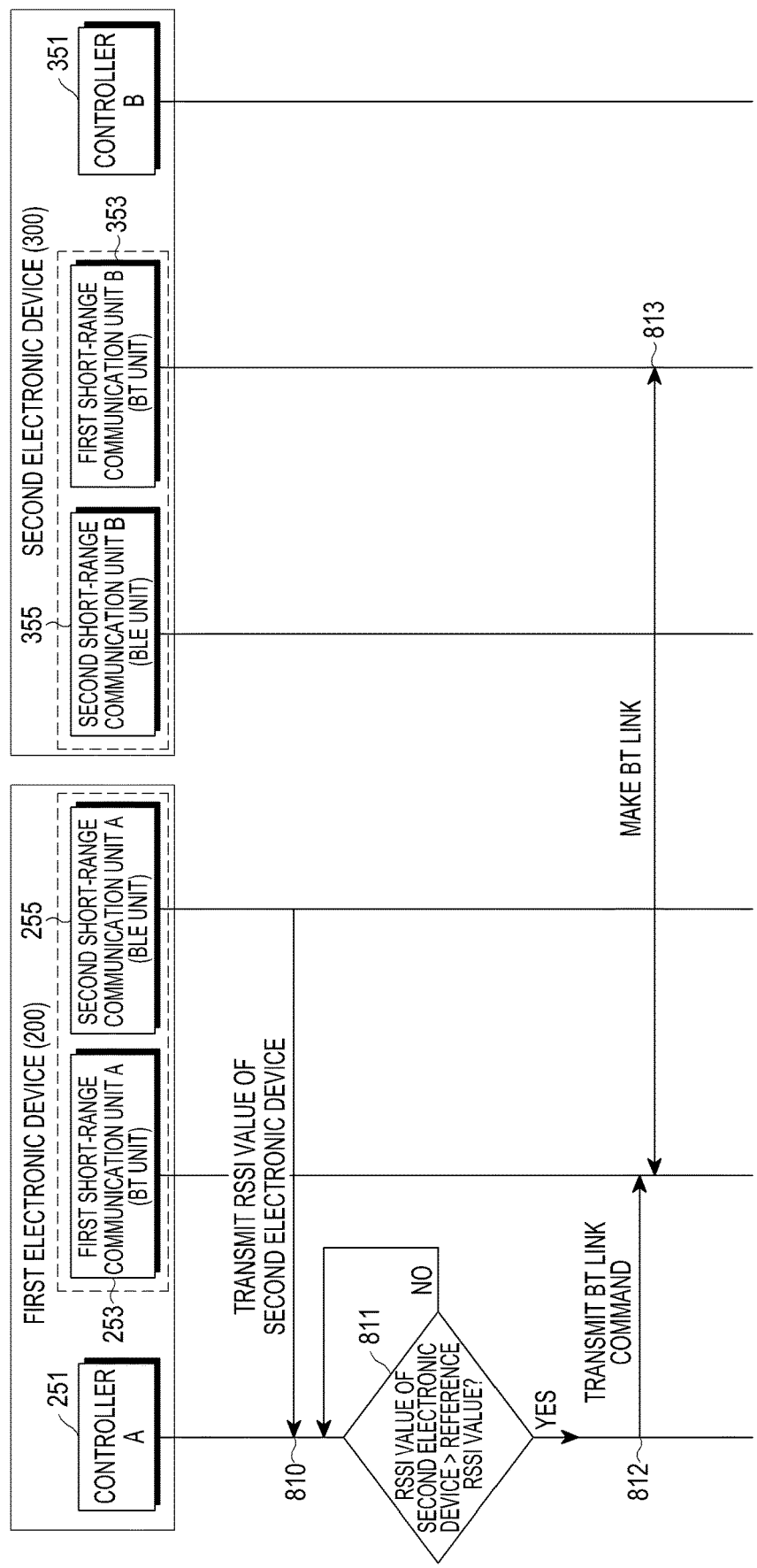

ELECTRONIC DEVICE AND COMMUNICATION CONNECTING METHOD THEREOF

CROSS-REFERENCE TO RELATED APPLICATION(S)

This application is a continuation application of prior application Ser. No. 14/916,106, which was the National Stage of an International Application number PCT/KR2014/008068, filed on Aug. 29, 2014 which claimed the benefit of a Korean patent application filed on Sep. 2, 2013, in the Korean Intellectual Property Office and assigned Serial number 10-2013-0104845, the entire disclosure of each of which is hereby incorporated by reference.

TECHNICAL FIELD

The present disclosure relates to an electronic device and a communication connecting method of an electronic device. More particularly, the present disclosure relates to an electronic device and a communication connecting method of an electronic device capable of connecting communication with low power in an electronic device.

BACKGROUND

Currently, various electronic devices, for example, mobile devices include wireless communication functions. Protocols or processes for wireless communication between the electronic devices have been established according to the wireless communication functions.

Direct short-range communication protocols between the electronic devices, for example, Bluetooth, direct Wi-Fi, and the like have been developed. The electronic devices may exchange data or control information with each other by using the short-range communication protocol.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a communication link method of the electronic device capable of making a communication link with low power.

In a state where a link is established between an electronic device and another electronic device through short-range communication (e.g., Bluetooth), a link loss may occur without any link release operation by a user. For example, when the electronic devices become separated from each other by more than a short-range communicable distance, the link loss may occur. In this case, a Bluetooth communication unit of the electronic device may inform a controller of the electronic device of a link loss state.

The controller may transmit a Bluetooth communication link command to the Bluetooth communication unit, and the Bluetooth communication unit having received the Bluetooth communication link command may attempt to establish a link for the Bluetooth communication with the other electronic device for a transaction timeout period (e.g., 30 seconds) existing in the Bluetooth communication link command.

However, in a situation such as a case where the other electronic device does not exist within a predetermined range in which the Bluetooth communication is possible, the electronic device may fail to establish a link for the Bluetooth communication with the other electronic device for the transaction timeout period (e.g., 30 seconds). The Bluetooth communication unit which has failed the Bluetooth communication with the other electronic device for the transaction timeout period repeatedly performs an operation of receiving a Bluetooth communication link command including the transaction timeout period from the controller and attempts to establish the link for the Bluetooth communication with the other electronic device for the transaction timeout period until the link of the Bluetooth communication with the other electronic device is made. The repeatedly performed operation may cause power consumption of the electronic device since the controller causes a wake up state in every transaction timeout period.

Another aspect of the present disclosure is to provide an electronic device and a communication link method of the electronic device capable of re-making the communication link with low power when the link loss occurs without any operation by the user in a state where a link of short-range communication is made.

In accordance with an aspect of the present disclosure, an electronic device is provided. The electronic device includes a first short-range communication unit configured to perform first short-range communication, a second short-range communication unit configured to perform second short-range communication with a lower power than that of the first short-range communication unit, and a controller configured to make a link of the first short-range communication with another electronic device by using the second short-range communication unit, wherein the second short-range communication unit is configured to attempt the second short-range communication with the other electronic device after the link of the first short-range communication is lost.

In accordance with another aspect of the present disclosure, a method of establishing a communication link by an electronic device is provided. The method includes performing first short-range communication with another electronic device by an electronic device, and after a link of the first short-range communication is lost, attempting second short-range communication with the other electronic device by the electronic device.

In accordance with another aspect of the present disclosure, an electronic device is provided. The electronic device includes a first communication unit configured to perform communication by using a first communication protocol, a second communication unit configured to perform communication by using a second communication protocol with a lower power than that of the first communication unit, and a controller configured to establish a first communication link by using the first communication unit, wherein the second communication unit is configured to attempt a second communication link after the first communication link stops.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a flowchart illustrating an operation for making a link of a short-range communication by an electronic device according to various embodiments of the present disclosure;

FIGS. 8A and 8B are flowcharts illustrating an operation for making a link of a short-range communication by an electronic device according to various embodiments of the present disclosure.

Throughout the drawings, like reference numerals will be understood to refer to like parts, components, and structures.

DETAILED DESCRIPTION

Figure 1:
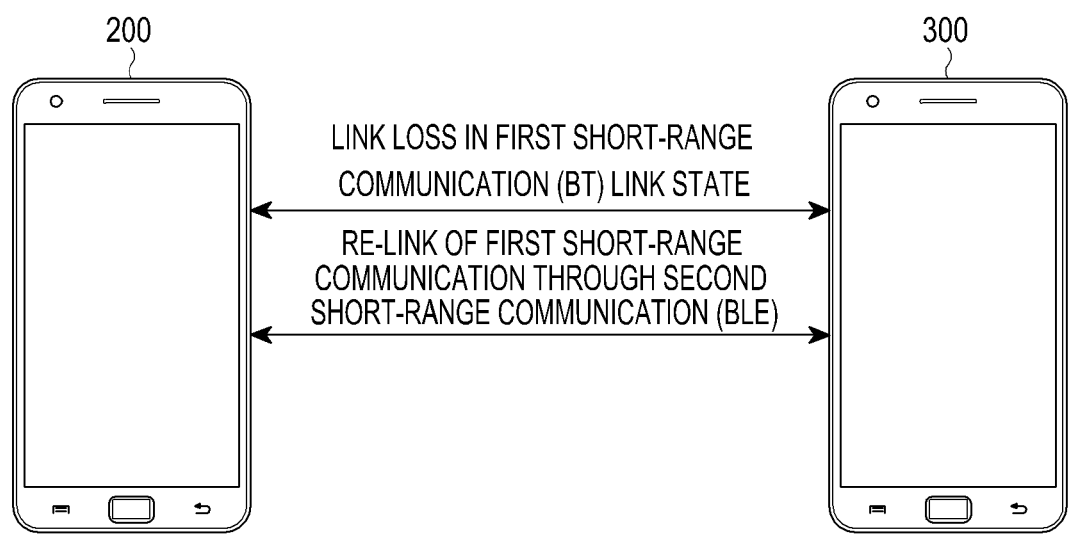
FIG. 1 illustrates a short-range communication link operation between electronic devices according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the present disclosure may be a device including a communication function. For example, the electronic device may be a combination of one or more of a smartphone, a tablet personal computer, a mobile phone, a video phone, an e-book reader, a desktop personal computer, a laptop personal computer, a netbook computer, a personal digital assistant (PDA), a portable multimedia player (PMP), an moving picture experts group layer-3 Audio (MP3) player, a mobile medical device, an electronic bracelet, an electronic necklace, an electronic appcessory, a camera, a wearable device, an electronic clock, a wrist watch, a home appliance (e.g. a refrigerator, an air conditioner, a cleaner, an oven, a microwave oven, a washing machine, a vacuum cleaner, etc.), an artificial intelligent robot, a television (TV), a digital versatile disc (DVD) player, an audio player, various medical machines (e.g. a magnetic resonance angiography (MRA), a magnetic resonance imaging (MRI), a computed tomography (CT), a tomography camera, a sonography device, and the like), a navigation device, a global positioning system (GPS) receiver, an event data recorder (EDR), a flight data recorder (FDR), a set-top box, a TV box (e.g. Samsung HomeSync™, Apple TV™, or Google TV™), an electronic dictionary, a vehicle infotainment device, electronic equipment for a ship (e.g. navigation equipment for a ship, a gyrocompass, and the like), avionic equipment, a security device, an electronic cloth, an electronic key, a camcorder, a game console, a head-mounted display (HMD), a flat panel display device, an electronic frame, an electronic album, a furniture or a part of a building/structure including a communication function, an electronic board, an electronic signature receiving device, a projector, and the like. It is obvious to those skilled in the art that the electronic device according to the present disclosure is not limited to the aforementioned devices.

FIG. 1 illustrates a short-range communication link operation between electronic devices according to various embodiments of the present disclosure.

Referring to FIG. 1, an electronic device 200 (hereinafter, referred to as a "first electronic device") may include a first short-range communication unit that may perform first short-range communication and a second short-range communication unit that may perform second short-range communication with lower power (low power) compared to the first short-range communication unit. According to another embodiment of the present disclosure, one short-range communication unit may have a first short-range communication mode using a first power amount and a second short-range communication mode using a second power amount. The second power amount may be different from the first power amount and, for example, may be lower than the first power amount.

When the first electronic device 200 has a link loss in a state where a link for first short-range communication is established between the first electronic device 200 and another electronic device 300 (hereinafter, referred to as a "second electronic device") through the first short-range communication unit, the first electronic device 200 may acquire a time point when the link with the second electronic device 300 is possible through a second short-range communication unit and attempt to re-establish a link with the second electronic device 300 through the first short-range communication unit at the connectable time point.

The second electronic device 300 may include the first short-range communication unit that may perform the first short-range communication and the second short-range communication unit that may perform the second short-range communication with lower power than that of the first short-range communication unit.

When a link loss occurs in a state where the second electronic device 300 has a link for the first short-range communication with the first electronic device 200 through the first short-range communication unit, the second electronic device 300 may broadcast an advertising packet including address information on the second electronic device through the second short-range communication unit. Thereafter, when a request for the link through the first short-range communication unit is made by the first electronic device 200, the second electronic device 300 may re-establish a link for the first short-range communication with the first electronic device 200.

According to various embodiments of the present disclosure, when the link loss occurs while the first short-range communication is connected, a scan role for performing a scan operation of the second short-range communication may be set to the first electronic device 200, and a broadcasting role for performing an advertising packet broadcasting operation of the second short-range communication may be preset to the second electronic device 300.

However, according to the role setting, the scan role for performing the scan operation of the second short-range communication may be set to the second electronic device 300 and the broadcasting role for performing the advertising packet broadcasting operation of the second short-range communication may be set to the first electronic device 200.

Figure 2:
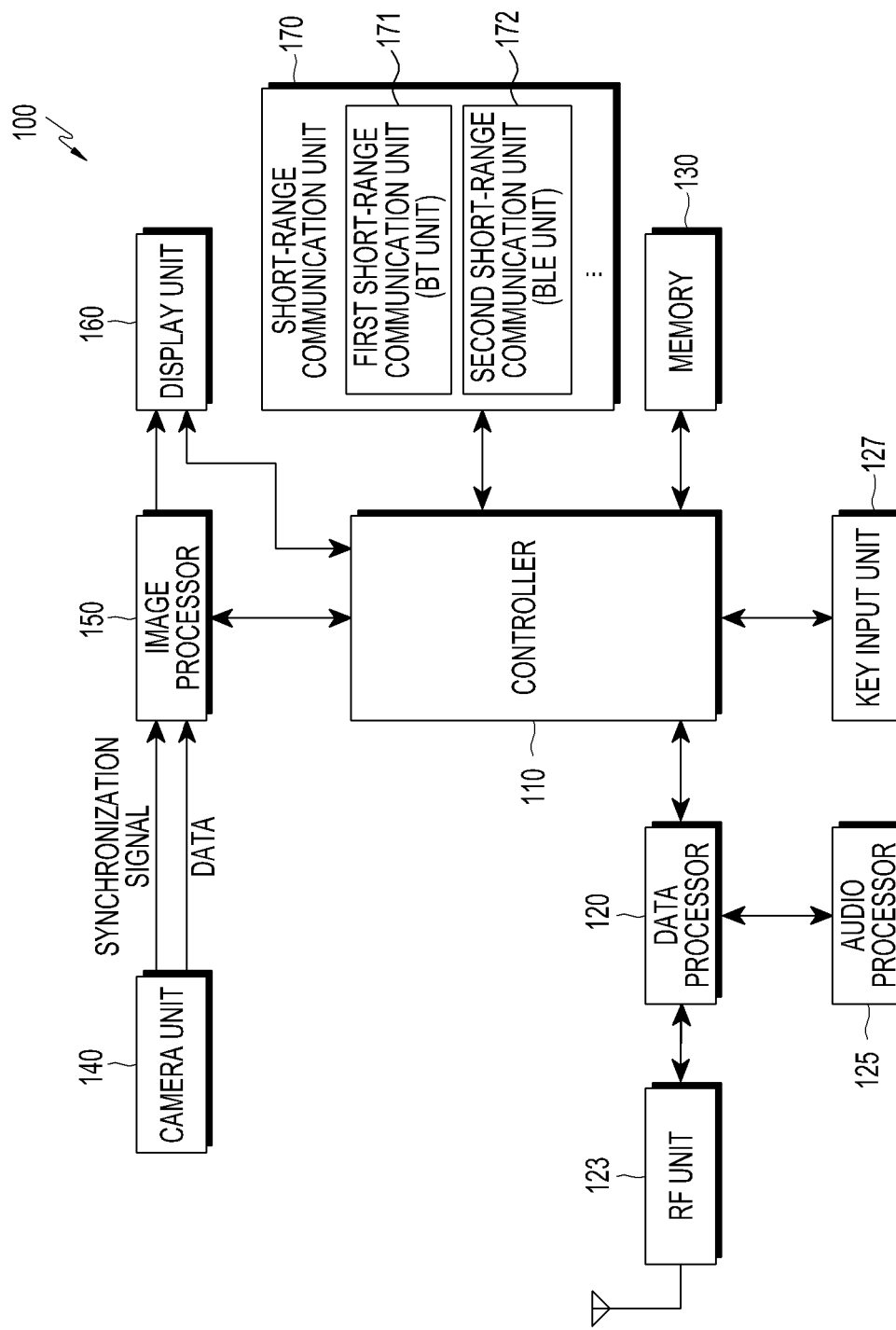
FIG. 2 schematically illustrates a configuration of an electronic device according to various embodiments of the present disclosure.

FIG. 2 schematically illustrates a configuration of an electronic device according to various embodiments of the present disclosure. The first electronic device 200 and the second electronic device 300 may have a configuration equal or similar to that illustrated in FIG. 2.

Referring to FIG. 2, an electronic device 100 has a radio frequency (RF) unit 123 and the RF unit 123 performs a wireless communication function of the electronic device 100. The RF unit 123 includes an RF transmitter for up-converting and amplifying a frequency of a transmitted signal and an RF receiver for low noise-amplifying a received signal and down-converting a frequency. A data processor 120 may include a transmitter for encoding and modulating the transmitted signal and a receiver for demodulating and decoding the received signal and the like. That is, the data processor 120 may include a modem and a codec. The codec may include a data codec for processing packet data and the like, and an audio codec for processing an audio signal such as a voice and the like. An audio processor 125 may perform a function of reproducing a received audio signal output from the audio codec of the data processor 120 or transmitting a transmitted audio signal generated from a microphone to the audio codec of the data processor 120.

A key input unit 127 may include keys for inputting number and character information and function keys for setting various functions.

A memory 130 may be configured by a program memory, and data memories. The program memory may store programs for controlling general operations of the electronic device 100 and programs for controlling re-establishment of a link for the first short-range communication through the second short-range communication with low power when the link loss of the first short-range communication occurs. Further, the data memory may perform a function of temporarily storing data generated while the programs are executed.

A controller 110 performs a function of controlling the general operations of the electronic device 100.

The scan role for performing the scan operation of the second short-range communication occurs when the link loss occurs while the first short-range communication is connected to the electronic device 100 (e.g., the first electronic device 200), if the controller 110 according to various embodiments of the present disclosure receives, from a first short-range communication unit 171, link loss state information for informing of the generation of the link loss in a state where the link with the second electronic device 300 is made, the controller 110 may transmit a scan command along with, for example, address information of the second electronic device to a second short-range communication unit 172.

After transmitting the scan command along with the address information of the second electronic device, when the controller 110 receives a message for informing of detection of the address information of the second electronic device 300 from the second short-range communication unit 172, the controller 110 may transmit a first short-range communication link command to the first short-range communication unit 171 to allow the first short-range communication unit 171 to attempt the link of the first short-range communication.

When the controller 110 receives first short-range communication link failure information from the first short-range communication unit 171 to which the first short-range communication link command has been transmitted, the controller 110 may make a request for a received signal strength indication (RSSI) value (hereinafter, referred to as an "RSSI value") of the second electronic device 300 to the second short-range communication unit 172.

When the controller 110 receives the RSSI value of the second electronic device 300 from the second short-range communication unit 172 and the received RSSI value is larger than or equal to a preset RSSI reference value, the controller 110 may transmit the first short-range communication link command to the first short-range communication unit 171. The RSSI reference value may include an RSSI value indicating that another electronic device is located within a predetermined range in which the link through the first short-range communication unit is possible.

Further, when the controller 110 receives, from the first short-range communication unit 171, link loss state information for informing of the occurrence of the link loss in the state where the connection with the second electronic device 300 is made, the controller 110 may transmit a scan command along with the address information of the second electronic device and the request for the RSSI value of the second electronic device to the second short-range communication unit 172.

When the RSSI value of the second electronic device 300 received from the second short-range communication unit 172 after the scan command is transmitted to the second short-range communication unit 172 along with the address information of the second electronic device and the request for the RSSI value of the second electronic device is larger than or equal to the RSSI reference value, the controller 110 may transmit the first short-range communication link command to the first short-range communication unit 171.

When the broadcasting role for broadcasting the advertising packet of the second short-range communication when the link loss occurs while the link of the first short-range communication is established is set to the electronic device 100 (e.g., like the second electronic device 300), if the controller 110 according to various embodiments of the present disclosure receives, from the first short-range communication unit 171, link loss state information for informing of the occurrence of the link loss in the state where the connection with the first electronic device 200 is made, the controller 110 may transmit an advertising packet broadcasting command to allow the second short-range communication unit 172 to broadcast the advertising packet including the address information of the second electronic device 300.

For example, the advertising packet may include a transmission power level (Tx power level) at which the RSSI value can be measured, and the Tx power level may be used as a value for measuring the RSSI value of the second electronic device 300 by the first electronic device 200. When a request for the link of the first short-range communication is made by the first electronic device 200, the controller 110 may make the link of the first short-range communication with the first electronic device 200.

A camera unit 140 photographs image data, and includes a camera sensor for converting a photographed optical signal to an electrical signal and a signal processor for converting an analog image signal photographed by the camera sensor to digital data. Here, it is assumed that the camera sensor is a charge coupled device (CCD) or complementary metal oxide semiconductor (CMOS) sensor, and the signal processor may be implemented by a digital signal processor (DSP). Further, the camera sensor and the signal processor may be implemented integrally or separately.

An image processor 150 performs image signal processing (ISP) for displaying an image signal output from the camera unit 140 on a display unit 160, and the ISP corresponds to a function such as gamma correction, interpolation, a spatial change, an image effect, image scaling, automatic white balance (AWB), automatic focusing (AF), automatic exposure (AE), and the like. Accordingly, the image processor 150 processes the image signal output from the camera unit 140 in the unit of frames, and outputs the frame image data in accordance with a characteristic and a size of the display unit 160. Further, the image processor 150 includes an image codec and performs a function of compressing the frame image data displayed on the display unit 160 through a set method or reconstructing the compressed frame image data into original frame image data. The image codec may be a joint photographic experts group (JPEG) codec, a moving picture experts group 4 (MPEG4) codec, a Wavelet codec, and the like. It is assumed that the image processor 150 may have an on-screen-display (OSD) function, and the image processor 150 may output OSD data according to a size of the displayed screen under a control of the controller 110.

The display unit 160 may display the image signal output from the image processor 150 on the screen and display user data output from the controller 110. The display unit 160 may use a liquid crystal display (LCD) and, in this case, may include an LCD controller, a memory for storing image data, and an LCD display device. When the LCD is implemented in a touch screen type, the display unit 160 may operate as an input unit and, at this time, keys such as the key input unit 127 may be displayed on the display unit 160.

Further, when the display unit 160 is used as a touch screen unit as the display unit 160 is implemented in the touch screen type, the touch screen unit may be configured by a touch screen panel (TSP) including a plurality of sensor panels, and the plurality of sensor panels may include a capacitive sensor panel capable of recognizing a hand touch and an electromagnetic induction sensor panel capable of detecting a fine touch made by a touch pen.

A short-range communication unit 170 may provide a short-range wireless communication function. The short-range communication unit 170 may include the first short-range communication unit 171 and the second short-range communication unit 172 according to various embodiments of the present disclosure. In various embodiments of the present disclosure, the first short-range communication unit 171 and the second short-range communication unit 172 are described as parts separated from each other. However, in another embodiment of the present disclosure, the first short-range communication unit 171 and the second short-range communication unit 172 may be integrated into one part.

In various embodiments of the present disclosure, the electronic device 100 may have the first short-range communication unit that consumes the first power amount and the second short-range communication unit that consumes the second power amount. The second power amount may be smaller than the first power amount. In other words, the second communication unit may consume lower power than the first communication unit.

According to an embodiment of the present disclosure, the first short-range communication unit 171 may include a communication unit (hereinafter, referred to as a "Bluetooth communication unit") using a Bluetooth protocol, and the second short-range communication unit 172 may include a communication unit (hereinafter, referred to as a "BLE communication unit") using a Bluetooth low energy (BLE) protocol. In embodiments of the present disclosure, power consumption or a consumed power amount of the second short-range communication unit 172 during operation may be smaller than that of the first short-range communication unit 171. In another embodiment of the present disclosure, it may be easily understood by those skilled in the art that the electronic device 100 may include various other combinations of a first short-range communication unit and a second short-range communication unit.

If the scan role is set to the electronic device 100 to perform the scan operation of the second short-range communication when the link loss occurs in the state where the first short-range communication is connected, (e.g., in the first electronic device 200), the first short-range communication unit 171 according to various embodiments of the present disclosure may transmit link loss state information to the controller 110 when the link loss occurs in the state where the first short-range communication is connected with the second electronic device 300.

When receiving a first short-range communication link command from the controller 110 after transmitting the link loss state information to the controller 110, the first short-range communication unit 171 may attempt a link of the first short-range communication with the second electronic device 300 through a paging operation.

If the scan role is set to the electronic device 100 to perform the scan operation of the second short-range communication when the link loss occurs in the state where the first short-range communication is connected (e.g., in the first electronic device 200), the second short-range communication unit 172 according to various embodiments of the present disclosure may perform the scan operation for a broadcasted advertising packet when the scan command is received along with address information of the second electronic device from the controller 110.

When the advertising packet broadcasted by the second electronic device 300 is scanned through the scan operation and the address information of the second electronic device exists in the advertising packet, the second short-range communication unit 172 may transmit a message that informs of the detection of the address information of the second electronic device 300 to the controller 110.

Alternatively, before or after transmitting the message that informs of the detection of the address information of the second electronic device 300 to the controller 110, the second short-range communication unit 172 may make a request for the link of the second short-range communication to the second electronic device 300, and thus establish the link for the second short-range communication with the second electronic device 300.

When receiving a request for an RSSI value of the second electronic device 300 from the controller 110 after transmitting the message that informs of the detection of the address information of the second electronic device 300 to the controller 110, the second short-range communication unit 172 may detect the RSSI value of the second electronic device 300. The second short-range communication unit 172 may detect the RSSI value by using a signal strength of the advertising packet having the address information of the second electronic device among the advertising packets received through the scan operation or detect the RSSI value by using a TX power level included in the advertising packet having the address information of the second electronic device, and transmit the detected RSSI value to the controller 110. Alternatively, when the link of the second short-range communication (BLE communication) is made with the second electronic device 300, the second short-range communication unit 172 may detect the RSSI value of the second electronic device 300 having the link of the second short-range communication and transmit the detected RSSI value to the controller 110.

When receiving a scan command along with the address information of the second electronic device 300 and the RSSI value of the second electronic device 300 from the controller 110, the second short-range communication unit 172 may perform the scan operation for the broadcasted advertising packet.

When the advertising packet broadcasted by the second electronic device 300 is scanned through the scan operation and the address information of the second electronic device exists in the advertising packet, the second short-range communication unit 172 may detect the RSSI value of the second electronic device. The second short-range communication unit 172 may detect the RSSI value by using a signal strength of the advertising packet having the address information of the second electronic device among the advertising packets received through the scan operation or detect the RSSI value by using a TX power level included in the advertising packet having the address information of the second electronic device, and transmit the detected RSSI value to the controller 110. Alternatively, when the link of the second short-range communication (BLE communication) is made with the second electronic device 300, the second short-range communication unit 172 may detect the RSSI value of the second electronic device 300 having the established link for the second short-range communication and transmit the detected RSSI value to the controller 110.

When the broadcasting role for broadcasting the advertising packet of the short-range communication when the link loss occurs in the state where the link of the first short-range communication is made is set to the electronic device 100 (e.g., the second electronic device 300), the second short-range communication unit 172 according to various embodiments of the present disclosure may broadcast the advertising packet including a TX power level along with the address information of the second electronic device when receiving an advertising packet broadcasting command from the controller 110. When a request for the link of the second short-range communication is made by the first electronic device 200 after broadcasting the advertising packet, the second short-range communication unit 172 may make the link of the second short-range communication with the first electronic device 200.

The short-range communication link operation between the first electronic device and the second electronic device, having the above described configuration will be described in detail with reference to FIGS. 3 to 8.

In FIGS. 3 to 8, the first electronic device 200 and the second electronic device 300 equally include the controller 110, the first short-range communication unit 171, and the second short-range communication unit 172 as illustrated in FIGS. 1 and 2, but the first electronic device 200 may include a controller A, a first short-range communication unit A, and a second short-range communication unit A and the second electronic device 300 may include a controller B, a first short-range communication unit B, and a second short-range communication unit B to differentiate the same configuration.

Figure 3:
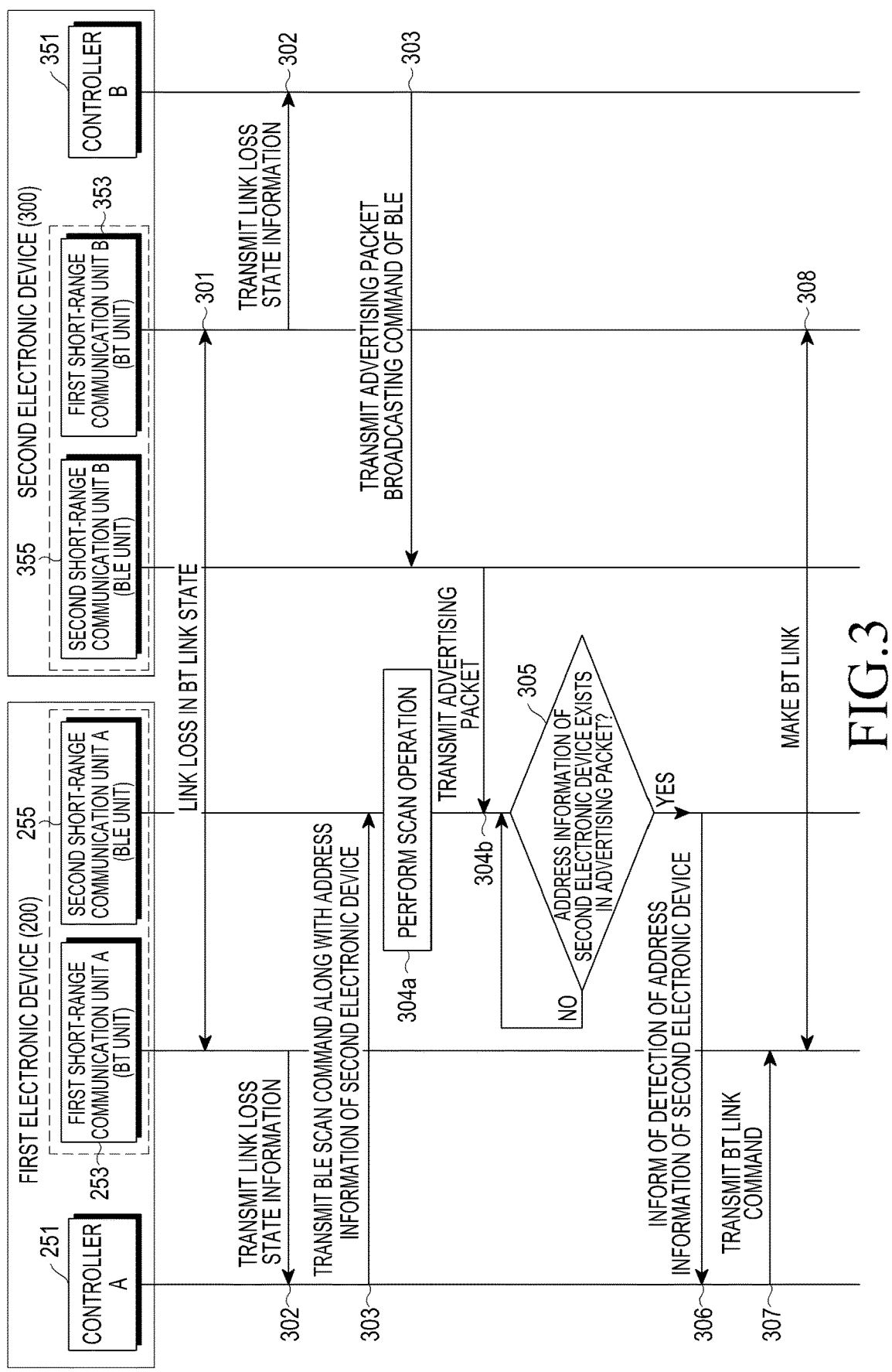
FIG. 3 is a flowchart illustrating an operation for establishing a communication link by an electronic device according to various embodiments of the present disclosure.

FIGS. 3 to 5 describe an operation for making the link of the first short-range communication using second short-range communication (BLE communication) without pairing of the second short-range communication (BLE communication), and FIGS. 6 to 8 describe an operation for making the link of the first short-range communication using second short-range communication (BLE communication) with pairing of the second short-range communication (BLE communication).

The operation for making the link of the first short-range communication using the second short-range communication (BLE communication) without pairing of the second short-range communication (BLE communication) will be first described with reference to FIGS. 3 to 5.

FIG. 3 is a flowchart illustrating an operation for making a link of a short-range communication by an electronic device according to various embodiments of the present disclosure.

A method and a process according to an embodiment will be described below with reference to the configuration of the electronic device illustrated in FIGS. 1 and 2.

Referring to FIG. 3, when an unintended link loss occurs without any operation by the user in a state where the link of BT communication corresponding to first short-range communication is made through a first short-range communication unit A 253 of the first electronic device 200 and a first short-range communication unit B 353 of the second electronic device 300 in operation 301, the first short-range communication unit A 253 may transmit link loss state information to a controller A 251 and the first short-range communication unit B 353 may transmit the link loss state information to a controller B 351 in operation 302.

When receiving the link loss state information from the first short-range communication unit A 253, the controller A 251 may transmit a BLE scan command along with address information of the second electronic device 300 with which the link loss occurred in the state where the link was established through the first short-range communication unit A 253 to a second short-range communication unit A 255 and then switch to a sleep mode in operation 303. In this case, the operation of the first short-range communication unit B 353 may stop.

When receiving the BLE scan command from the controller A 251, the second short-range communication unit A 255 may perform a scan operation of scanning for a broadcasted advertising packet in operation 304a.

When receiving the link loss state information from the first short-range communication unit B 353, the controller B 351 may transmit a broadcasting command for the advertising packet to a second short-range communication unit B 355 and then switch to the sleep mode in operation 303. In this case, the operation of the first short-range communication unit A 253 may also stop.

When receiving the broadcasting command for the advertising packet from the controller B 351, the second short-range communication unit B 355 may broadcast the advertising packet including the address information of the second electronic device 300 in operation 304b.

As the second short-range communication unit B 355 broadcasts the advertising packet, the second short-range communication unit A 255 may scan for the advertising packet broadcasted by the second short-range communication unit B 355 through the scan operation.

When the address information of the second electronic device 300 is detected in the scanned advertising packet in operation 305, the second short-range communication unit A 255 may transmit a message that informs of the detection of the address information of the second electronic device 300 to the controller A 251 in operation 306.

When receiving the message that informs of the detection of the address information of the second electronic device 300 from the second short-range communication unit A 255, the controller A 251 may switch to a wake up mode from the sleep mode and transmit a command for the link of the first short-range communication with the second electronic device 300 to the first short-range communication unit A 253 in operation 307. Since the first short-range communication (BT communication) and the second short-range communication (BLE communication) have similar communication link ranges, a state in which the link of the second short-range communication is possible through reception of the advertising packet broadcasted by the second electronic device 300 may refer to a state in which the first short-range communication is possible. Further, the above method also can be applied when the communication link range of the second short-range communication is smaller than the communication link range of the first short-range communication as well as the case where the first short-range communication and the second short-range communication have the similar communication link ranges.

Accordingly, when receiving the command for the link of the first short-range communication with the second electronic device 300 from the controller A 251, the first short-range communication unit A 253 may attempt paging for the link of the first short-range communication with the second electronic device 300. At this time, when the first short-range communication unit A 253 and the first short-range communication unit B 353 of the second electronic device 300, which performs the paging scan, are in synchronization, the link of the BT communication corresponding to the first short-range communication may be re-made between the first electronic device 200 and the second electronic device 300 through the first short-range communication unit A 253 and the first short-range communication unit B 353 in operation 308.

Figure 4A:
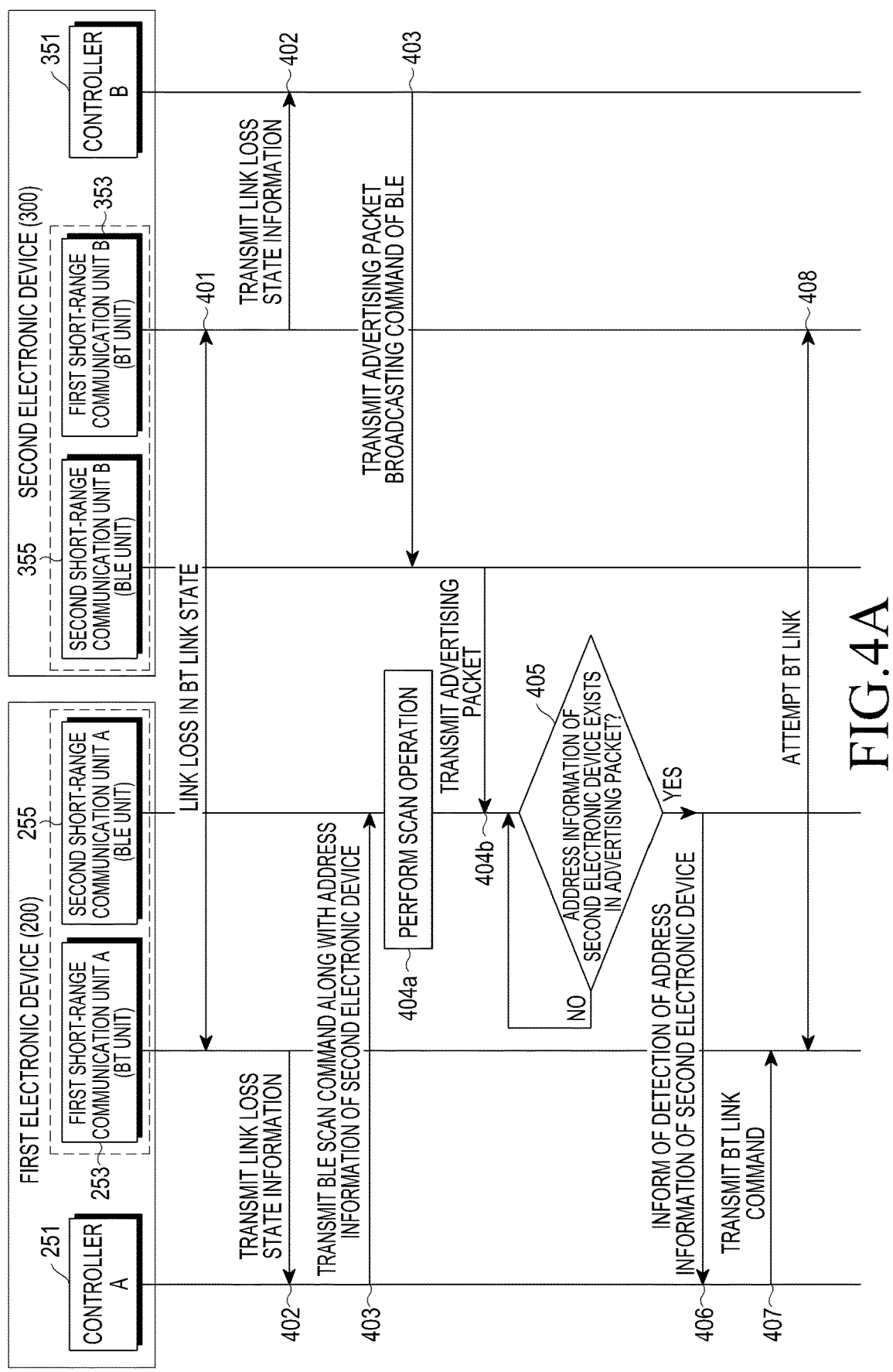
FIGS. 4A and 4B are flowcharts illustrating an operation for establishing a link for a short-range communication by an electronic device according to various embodiments of the present disclosure.
Figure 4B:
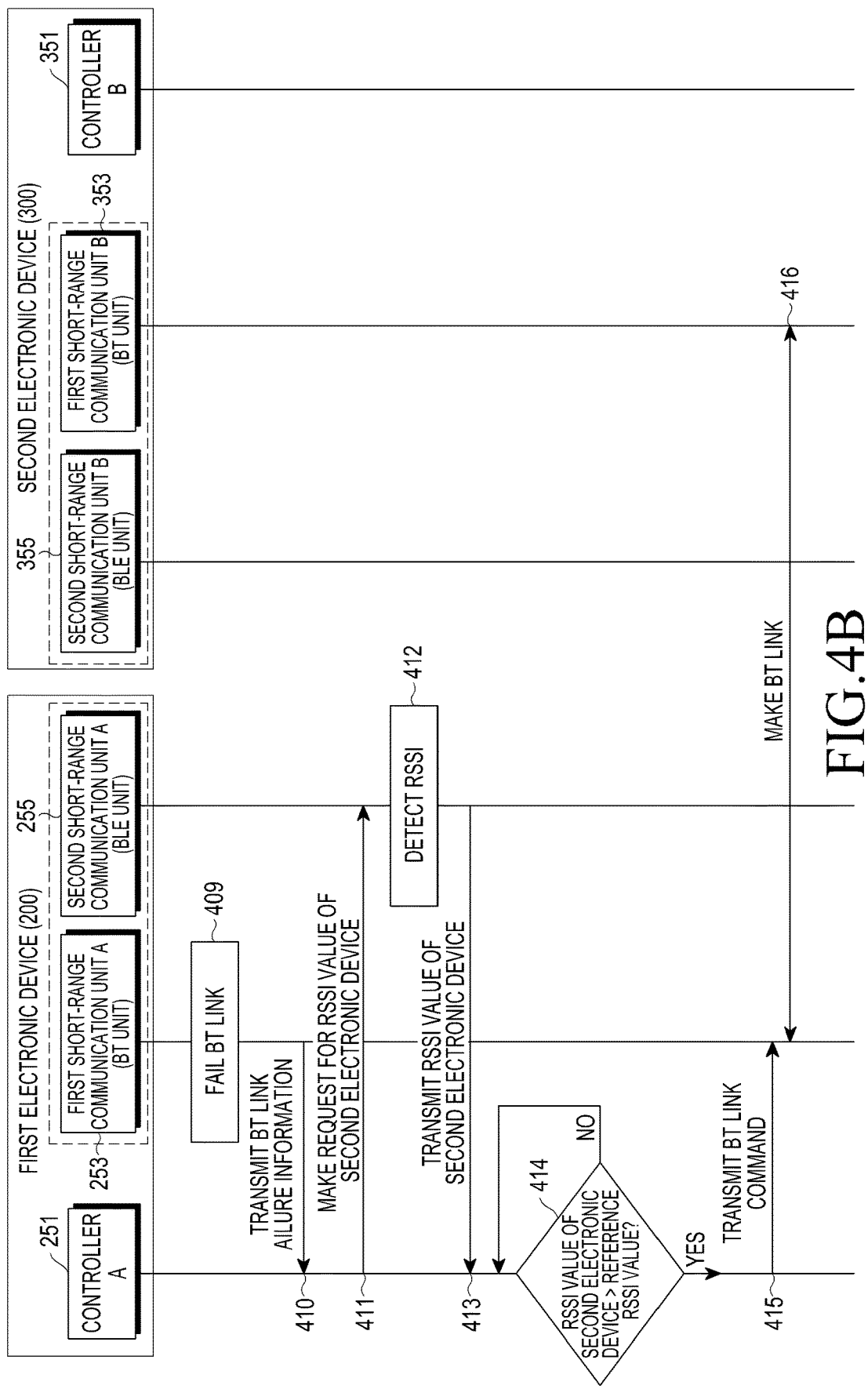

FIGS. 4A and 4B are flowcharts illustrating an operation for making a link of a short-range communication by an electronic device according to various embodiments of the present disclosure.

A method and a process according to an embodiment will be described below with reference to the configuration of the electronic device illustrated in FIGS. 1 and 2.

Referring to FIGS. 4A and 4B, when an unintended link loss occurs without any operation by the user in a state where the link of BT communication corresponding to the first short-range communication is made through the first short-range communication unit A 253 of the first electronic device 200 and the first short-range communication unit B 353 of the second electronic device 300 in operation 401, the first short-range communication unit A 253 may transmit link loss state information to the controller A 251 and the first short-range communication unit B 353 may transmit the link lost state information to the controller B 351 in operation 402.

When receiving the link lost state information from the first short-range communication unit A 253, the controller A 251 may transmit a BLE scan command along with address information of the second electronic device 300 with which the link loss occurred in the state where the link was established through the first short-range communication unit A 253 to the second short-range communication unit A 255 in operation 403. When receiving the BLE scan command from the controller A 251, the second short-range communication unit A 255 may perform a scan operation of scanning for a broadcasted advertising packet in operation 404a.

When receiving the link loss state information from the first short-range communication unit B 353, the controller B 351 may transmit a broadcasting command for the advertising packet to the second short-range communication unit B 355 in operation 403. When receiving the broadcasting command for the advertising packet from the controller B 351, the second short-range communication unit B 355 may broadcast the advertising packet in operation 404b.

As the second short-range communication unit B 355 broadcasts the advertising packet, the second short-range communication unit A 255 may scan for the advertising packet broadcasted by the second short-range communication unit B 355 through the scan operation.

When the address information of the second electronic device 300 is detected in the scanned advertising packet in operation 405, the second short-range communication unit A 255 may transmit a message that informs of the detection of the address information of the second electronic device 300 to the controller A 251 in operation 406.

When receiving the message that informs of the detection of the address information of the second electronic device 300 from the second short-range communication unit A 255, the controller A 251 may switch to a wake up mode and transmit a command for the link of the first short-range communication with the second electronic device 300 to the first short-range communication unit A 253 in operation 407.

When receiving the command for the link of the first short-range communication with the second electronic device 300 from the controller A 251, the first short-range communication unit A 253 may attempt the link of the first short-range communication (BT) with the second electronic device 300 in operation 408.

However, when the link of the first short-range communication with the second electronic device 300 fails, the first short-range communication unit A 253 may determine the failure of the link of the first short-range communication in operation 409 and transmit first short-range communication link failure information to the controller A 251 in operation 410.

When receiving the first short-range communication link failure information from the first short-range communication unit A 253, the controller A 251 may make a request for an RSSI value of the second electronic device 300 to the second short-range communication unit A 255 in operation 411.

When receiving the request for the RSSI value of the second electronic device 300 from the controller A 251, the second short-range communication unit A 255 may perform operation 412 of detecting the RSSI value by using the advertising packet having the address information of the second electronic device among the advertising packets scanned through the continuous scan operation. In operation 412, the second short-range communication unit A 255 may detect the RSSI value through a signal strength of the advertising packet or detect the RSSI value by using a Tx power level included in the advertising packet.

When the second short-range communication unit A 255 transmits the detected RSSI value to the controller A 251 in operation 413, the controller A 251 may perform operation 414 of comparing the RSSI value received from the second short-range communication unit A 255 with a preset reference RSSI value. When the RSSI value received from the second short-range communication unit A 255 is larger than or equal to the preset reference RSSI value, the controller A 251 may transmit a command for the link of the first short-range communication with the second electronic device 300 to the first short-range communication unit A 253 in operation 415.

When receiving the command for the link of the first short-range communication with the second electronic device 300 from the controller A 251, the first short-range communication unit A 253 may attempt paging for the link of the first short-range communication with the second electronic device 300. At this time, when the first short-range communication unit A 253 and the first short-range communication unit B 353 of the second electronic device 300, which performs the paging scan, are in synchronization, the link of the BT communication corresponding to the first short-range communication may be re-made between the first electronic device 200 and the second electronic device 300 through the first short-range communication unit A 253 and the first short-range communication unit B 353 in operation 416.

Since the first short-range communication (BT communication) and the second short-range communication (BLE communication) have similar communication link ranges but not the same communication range, if the link of the first short-range communication fails when the link of the second short-range communication (BLE communication) is possible, a distance to the second electronic device may be accurately determined through the RSSI value and the link of the first short-range communication is made again.

Figure 5A:
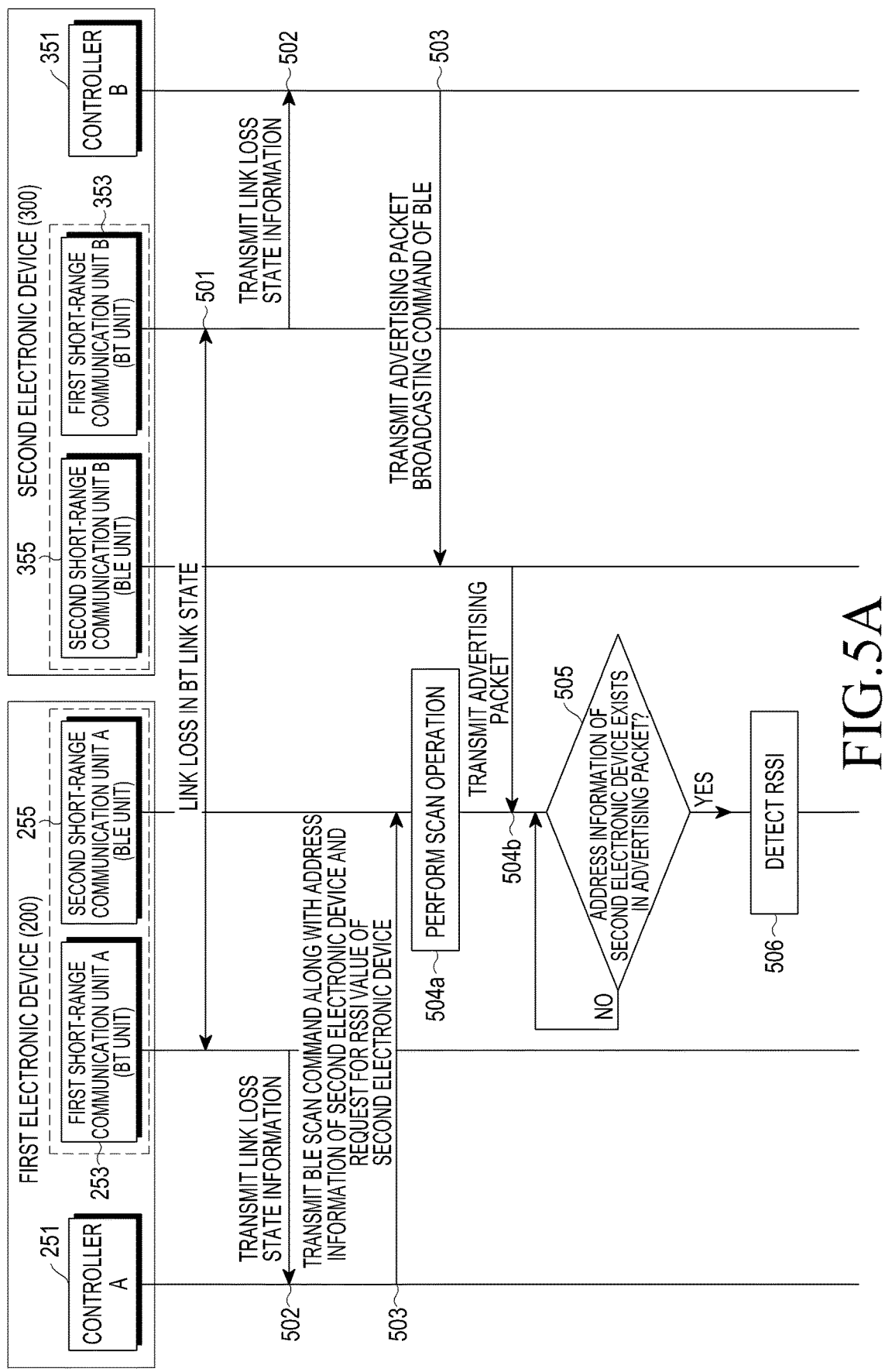
FIGS. 5A and 5B are flowcharts illustrating an operation for making a link of a short-range communication by an electronic device according to various embodiments of the present disclosure.
Figure 5B:
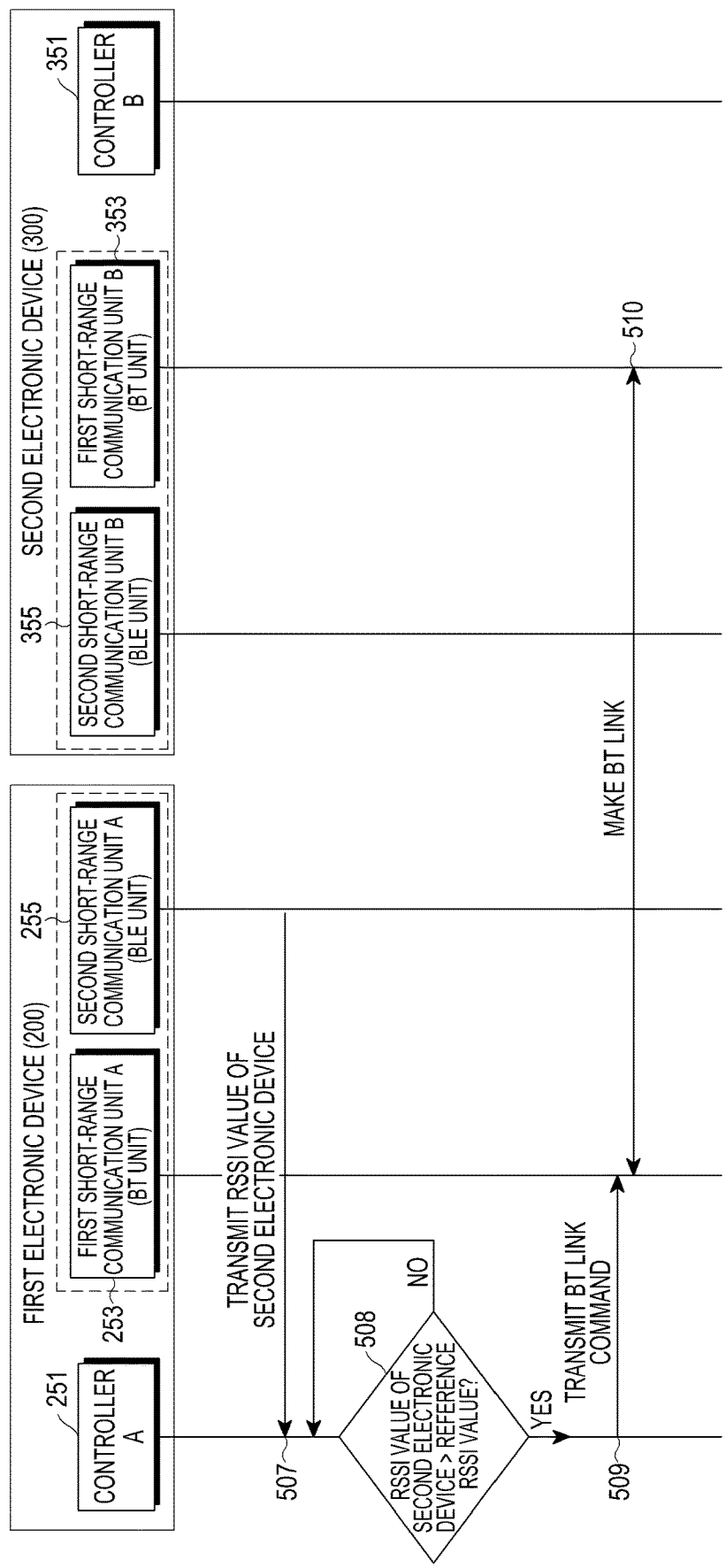

FIGS. 5A and 5B are flowcharts illustrating an operation for making a link of a short-range communication by an electronic device according to various embodiments of the present disclosure.

A method and a process according to an embodiment will be described below with reference to the configuration of the electronic device illustrated in FIGS. 1 and 2.

Referring to FIGS. 5A and 5B, when an unintended link loss occurs without any operation by the user in a state where the link of BT communication corresponding to the first short-range communication is made through the first short-range communication unit A 253 of the first electronic device 200 and the first short-range communication unit B 353 of the second electronic device 300 in operation 501, the first short-range communication unit A 253 may transmit link loss state information to the controller A 251 and the first short-range communication unit B 353 may transmit the link loss state information to the controller B 351 in operation 502.

When receiving the link loss state information from the first short-range communication unit A 253, the controller A 251 may transmit a BLE scan command along with address information of the second electronic device 300 with which the link loss occurred in the state where the link was established through the first short-range communication unit A 253 and a request for an RSSI value of the second electronic device to the second short-range communication unit A 255 in operation 503. When receiving the BLE scan command from the controller A 251, the second short-range communication unit A 255 may perform a scan operation of scanning for a broadcasted advertising packet in operation 504a.

When receiving the link loss state information from the first short-range communication unit B 353, the controller B 351 may transmit a broadcasting command for the advertising packet to the second short-range communication unit B 355 in operation 503.

When receiving the broadcasting command for the advertising packet from the controller B 351, the second short-range communication unit B 355 may broadcast the advertising packet in operation 504b.

As the second short-range communication unit B 355 broadcasts the advertising packet, the second short-range communication unit A 255 may scan for the advertising packet broadcasted by the second short-range communication unit B 355 through the scan operation.

When the address information of the second electronic device 300 is detected in the scanned advertising packet in operation 505, the second short-range communication unit A 255 may detect the RSSI value of the second electronic device 300 in operation 506.

In operation 506, the second short-range communication unit A 255 may detect the RSSI value through a signal strength of the advertising packet or detect the RSSI value by using a Tx power level included in the advertising packet.

When the second short-range communication unit A 255 transmits the detected RSSI value to the controller A 251 in operation 507, the controller A 251 may perform operation 508 of comparing the RSSI value received from the second short-range communication unit A 255 with a preset reference RSSI value. When the RSSI value received from the second short-range communication unit A 255 is larger than or equal to the preset reference RSSI value, the controller A 251 may transmit a command for the link of the first short-range communication with the second electronic device 300 to the first short-range communication unit A 253 in operation 509.

When receiving the command for the link of the first short-range communication with the second electronic device 300 from the controller A 251, the first short-range communication unit A 253 may attempt paging for the link of the first short-range communication with the second electronic device 300. At this time, when the first short-range communication unit A 253 and the first short-range communication unit B 353 of the second electronic device 300, which performs the paging scan, are in synchronization, the link of the BT communication corresponding to the first short-range communication may be re-made between the first electronic device 200 and the second electronic device 300 through the first short-range communication unit A 253 and the first short-range communication unit B 353 in operation 510.

Next, the operation for making the link of the first short-range communication using the second short-range communication (BLE communication) with the pairing of the second short-range communication (BLE communication) will be first described with reference to FIGS. 6 to 8.

FIG. 6 is a flowchart illustrating an operation for making a link of a short-range communication by an electronic device according to various embodiments of the present disclosure.

A method and a process according to an embodiment will be described below with reference to the configuration of the electronic device illustrated in FIGS. 1 and 2.

Referring to FIG. 6, when an unintended link loss occurs without any operation by the user in a state where the link of BT communication corresponding to first short-range communication is made through the first short-range communication unit A 253 of the first electronic device 200 and the first short-range communication unit B 353 of the second electronic device 300 in operation 601, the first short-range communication unit A 253 may transmit link loss state information to the controller A 251 and the first short-range communication unit B 353 may transmit the link loss state information to the controller B 351 in operation 602.

When receiving the link loss state information from the first short-range communication unit A 253, the controller A 251 may transmit a BLE background link command along with address information of the second electronic device 300 with which the link loss occurs in the state where the link was established through the first short-range communication unit A 253 to the second short-range communication unit A 255 and switch to a sleep mode in operation 603. The BLE background link command corresponds to a command which the controller transmits to a BLE communication unit to perform a BLE link without any additional command when a BLE link condition is met.

When receiving the BLE background link command from the controller A 251, the second short-range communication unit A 255 may perform a scan operation of scanning for a broadcasted advertising packet in operation 604*a*.

When receiving the link loss state information from the first short-range communication unit B 353, the controller B 351 may transmit a broadcasting command for the advertising packet to the second short-range communication unit B 355 and switch to the sleep mode in operation 603. When receiving the broadcasting command for the advertising packet from the controller B 351, the second short-range communication unit B 355 may broadcast the advertising packet in operation 604*b*.

As the second short-range communication unit B 355 broadcasts the advertising packet, the second short-range communication unit A 255 may scan for the advertising packet broadcasted by the second short-range communication unit B 355 through the scan operation.

When the address information of the second electronic device 300 is detected in the scanned advertising packet in operation 605, the second short-range communication unit A 255 may make a request for the link for BLE communication corresponding to the second short-range communication to the second short-range communication unit B 355 in operation 606.

When a response to the link of the BLE communication is received from the second short-range communication unit B 355 in operation 607, the first electronic device 200 and the second electronic device 300 may establish the link of the BLE communication corresponding to the second short-range communication through the second short-range communication unit A 255 and the second short-range communication unit B 355 in operation 608.

The second short-range communication unit A 255 having the established link of the BLE communication through the second short-range communication unit B 355 may transmit a message that informs of the detection of the address information of the second electronic device 300 to the controller A 251 in operation 609.

The BLE link operation through operations 606 to 608 may be performed after or simultaneously with operation 609 of transmitting the message that informs the controller A 251 of the detection of the address information of the second electronic device 300.

When receiving the message that informs of the detection of the address information of the second electronic device 300 from the second short-range communication unit A 255, the controller A 251 may switch to a wake up mode from the sleep mode and transmit a command for the link of the first short-range communication with the second electronic device 300 to the first short-range communication unit A 253 in operation 610.

Since the first short-range communication (BT communication) and the second short-range communication (BLE communication) have similar communication link ranges, a state in which the link of the second short-range communication is possible through reception of the advertising packet broadcasted by the second electronic device may refer to a state in which the first short-range communication is possible.

Accordingly, when receiving the command for the link of the first short-range communication with the second electronic device 300 from the controller A 251, the first short-range communication unit A 253 may attempt paging for the link of the first short-range communication with the second electronic device 300. At this time, when the first short-range communication unit A 253 and the first short-range communication unit B 353 of the second electronic device 300, which performs the paging scan, are in synchronization, the link of the BT communication corresponding to the first short-range communication may be re-made between the first electronic device 200 and the second electronic device 300 through the first short-range communication unit A 253 and the first short-range communication unit B 353 in operation 611.

Figure 7A:
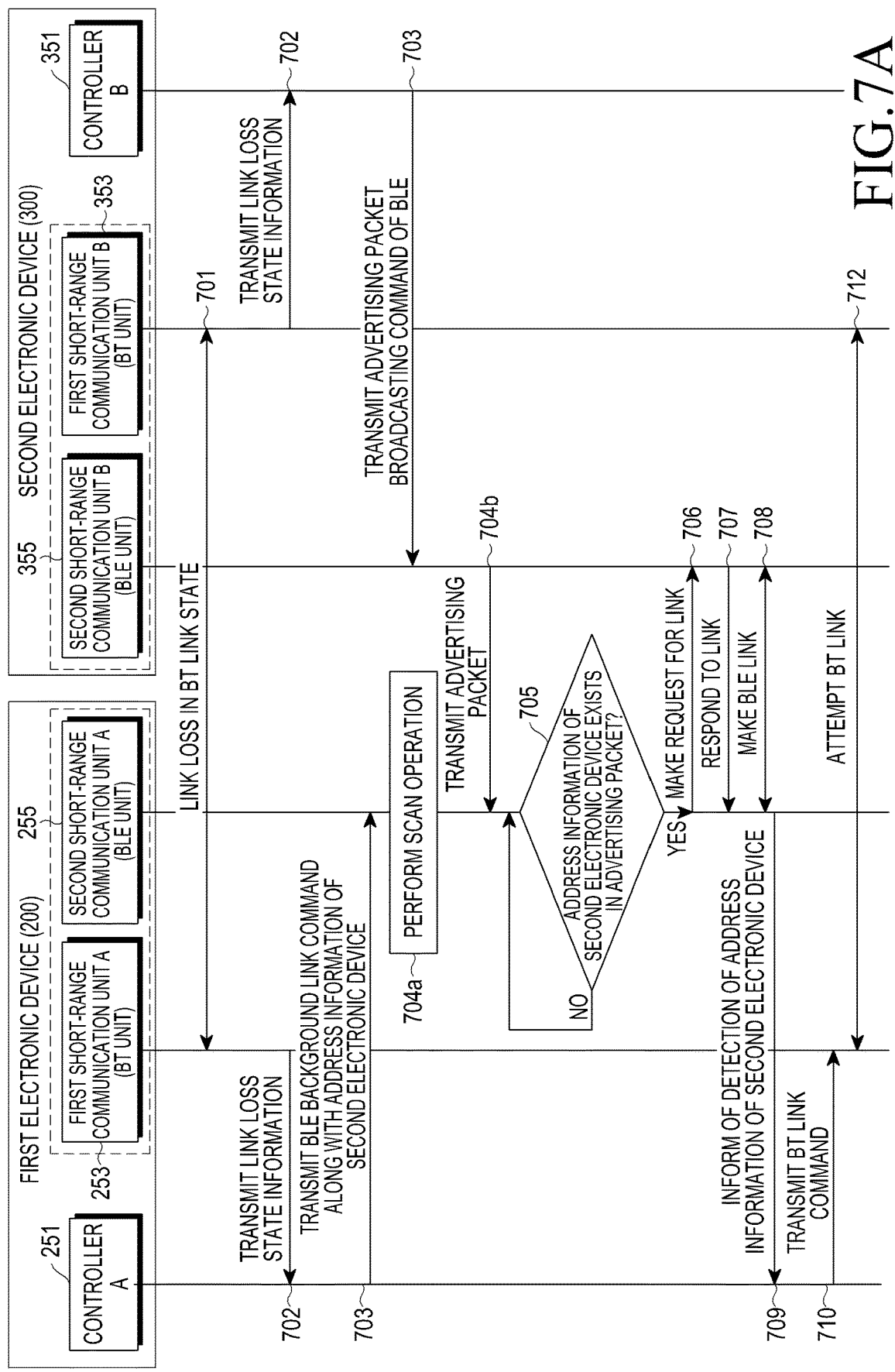
FIGS. 7A and 7B are flowcharts illustrating an operation for making a link of a short-range communication by an electronic device according to various embodiments of the present disclosure.
Figure 7B:
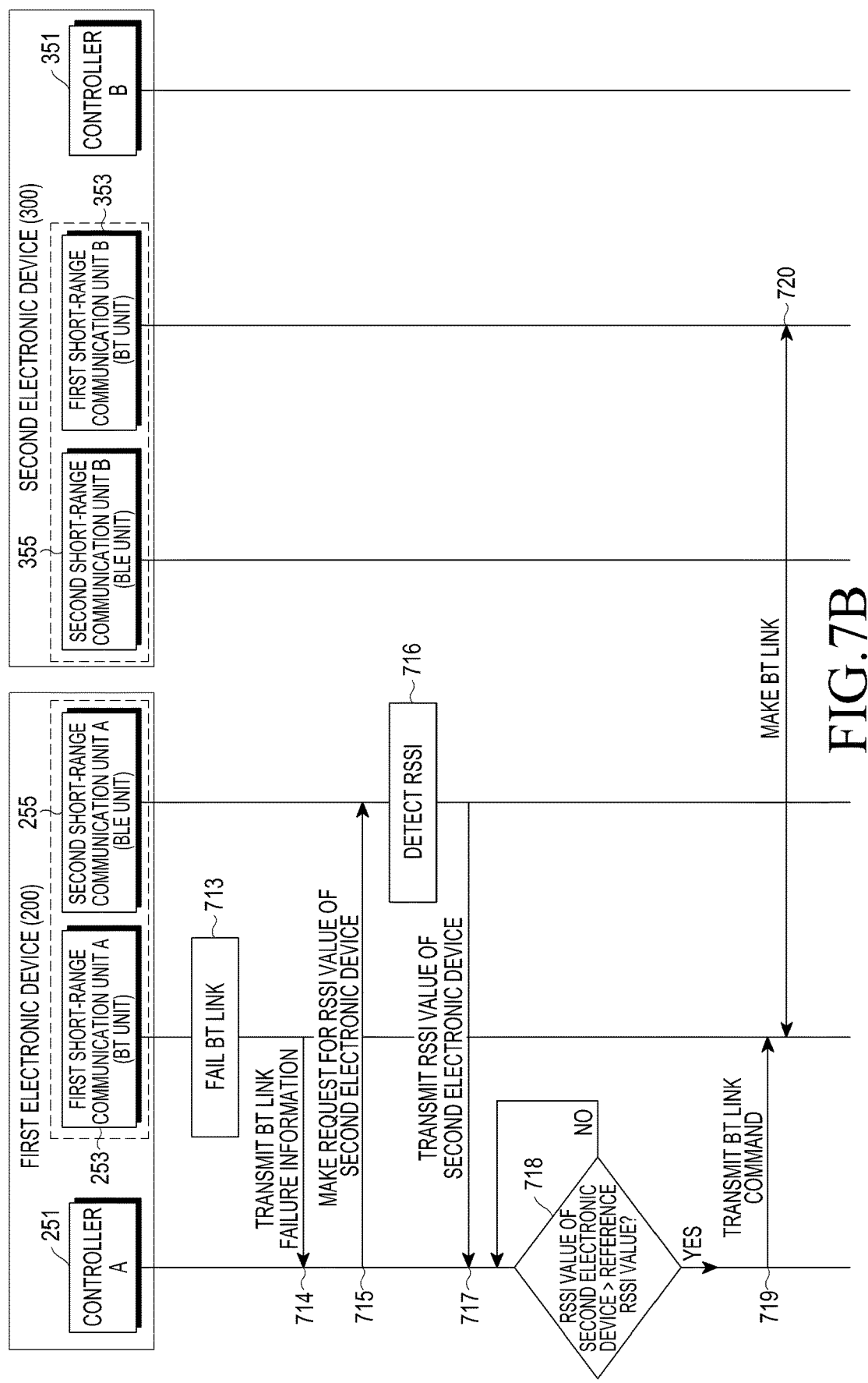

FIGS. 7A and 7B are flowcharts illustrating an operation for making a link of a short-range communication by an electronic device according to various embodiments of the present disclosure.

A method and a process according to an embodiment will be described below with reference to the configuration of the electronic device illustrated in FIGS. 1 and 2.

Referring to FIGS. 7A and 7B, when an unintended link loss occurs without any operation by the user in a state where the link of BT communication corresponding to the first short-range communication is made through the first short-range communication unit A 253 of the first electronic device 200 and the first short-range communication unit B 353 of the second electronic device 300 in operation 701, the first short-range communication unit A 253 may transmit link loss state information to the controller A 251 and the first short-range communication unit B 353 may transmit the link loss state information to the controller B 351 in operation 702.

When receiving the link loss state information from the first short-range communication unit A 253, the controller A 251 may transmit a BLE background link command along with address information of the second electronic device 300 with which the link loss occurs in the state where the link was established through the first short-range communication unit A 253 to the second short-range communication unit A 255 in operation 703. When receiving the BLE background link command from the controller A 251, the second short-range communication unit A 255 may perform a scan operation of scanning for a broadcasted advertising packet in operation 704*a*.

When receiving the link loss state information from the first short-range communication unit B 353, the controller B 351 may transmit a broadcasting command for the advertising packet to the second short-range communication unit B 355 in operation 703. When receiving the broadcasting command for the advertising packet from the controller B 351, the second short-range communication unit B 355 may broadcast the advertising packet in operation 704*b*.

As the second short-range communication unit B 355 broadcasts the advertising packet, the second short-range communication unit A 255 may scan for the advertising packet broadcasted by the second short-range communication unit B 355 through the scan operation.

When the address information of the second electronic device 300 is detected in the scanned advertising packet in operation 705, the second short-range communication unit A 255 may make a request for the link for BLE communication corresponding to the second short-range communication to the second short-range communication unit B 355 in operation 706.

When a response to the link of the BLE communication is received from the second short-range communication unit B 355 in operation 707, the first electronic device 200 and the second electronic device 300 may have the link of the BLE communication corresponding to the second short-range communication through the second short-range communication unit A 255 and the second short-range communication unit B 355 in operation 708.

The second short-range communication unit A 255 having the established link of the BLE communication through the second short-range communication unit B 355 may transmit a message that informs of the detection of the address information of the second electronic device 300 to the controller A 251 in operation 709.

The BLE link operation through operations 706 to 708 may be performed after or simultaneously with operation 709 of transmitting the message that informs the controller A 251 of the detection of the address information of the second electronic device 300.

When receiving the message that informs of the detection of the address information of the second electronic device 300 from the second short-range communication unit A 255, the controller A 251 may switch to a wake up mode and transmit a command for the link of the first short-range communication with the second electronic device 300 to the first short-range communication unit A 253 in operation 710.

When receiving the command for the link of the first short-range communication with the second electronic device 300 from the controller A 251, the first short-range communication unit A 253 may attempt the link of the first short-range communication with the second electronic device 300 in operation 712.

However, when the link of the first short-range communication with the second electronic device 300 fails, the first short-range communication unit A 253 may determine the failure of the link of the first short-range communication in operation 713 and transmit first short-range communication link failure information to the controller A 251 in operation 714.

When receiving the first short-range communication link failure information from the first short-range communication unit A 253, the controller A 251 may make a request for an RSSI value of the second electronic device 300 to the second short-range communication unit A 255 in operation 715.

When receiving a request for the RSSI value of the second electronic device 300 from the controller A 251, the second short-range communication unit A 255 may detect the RSSI value of the second electronic device having the link of BLE communication corresponding to the second short-range communication in operation 716 and transmit the detected RSSI value to the controller A 251 in operation 717.

The controller A 251 may compare the RSSI value received from the second short-range communication unit A 255 with a preset reference RSSI value in operation 718. When the RSSI value received from the second short-range communication unit A 255 is larger than or equal to the preset reference RSSI value, the controller A 251 may transmit a command for the link of the first short-range communication with the second electronic device 300 to the first short-range communication unit A in operation 719.

When receiving the command for the link of the first short-range communication with the second electronic device 300 from the controller A 251, the first short-range communication unit A 253 may attempt paging for the link of the first short-range communication with the second electronic device 300. At this time, when the first short-range communication unit A 253 and the first short-range communication unit B 353 of the second electronic device 300, which performs the paging scan, are in synchronization, the link of the BT communication corresponding to the first short-range communication may be re-made between the first electronic device 200 and the second electronic device 300 through the first short-range communication unit A 253 and the first short-range communication unit B 353 in operation 720.

Since the first short-range communication (BT communication) and the second short-range communication (BLE communication) have similar communication link ranges but not the same communication range, if the link of the first short-range communication fails when the link of the second short-range communication (BLE communication) is possible, a distance to the second electronic device may be accurately determined through the RSSI value and the link of the first short-range communication is made again.

Figure 8A:
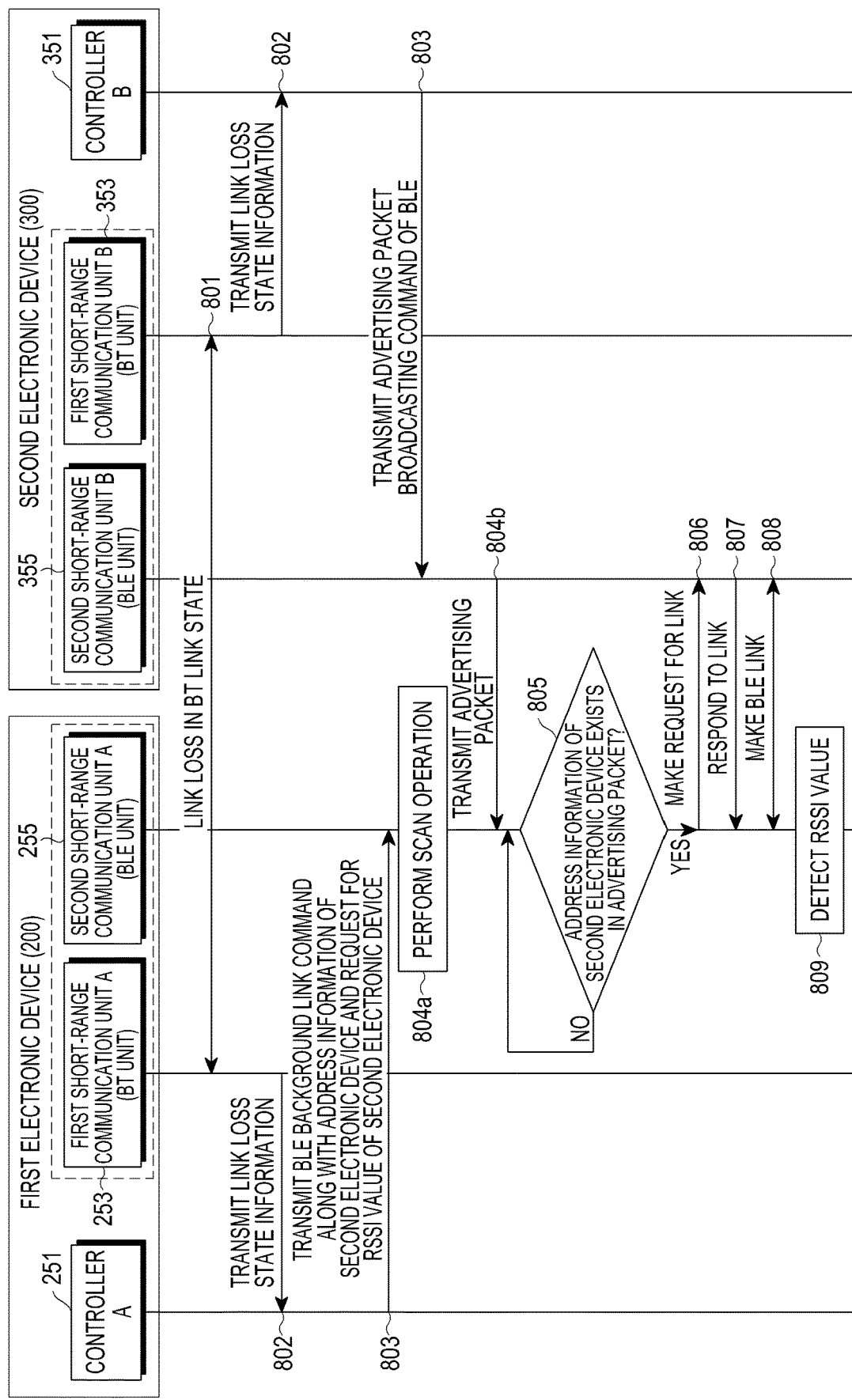

FIGS. 8A and 8B are flowcharts illustrating an operation for making a link of a short-range communication by an electronic device according to one of various embodiments of the present disclosure.

A method and a process according to an embodiment will be described below with reference to the configuration of the electronic device illustrated in FIGS. 1 and 2.

Referring to FIGS. 8A and 8B, when an unintended link loss occurs without any operation by the user in a state where the link of BT communication corresponding to the first short-range communication is made through the first short-range communication unit A 253 of the first electronic device 200 and the first short-range communication unit B 353 of the second electronic device 300 in operation 801, the first short-range communication unit A 253 may transmit link loss state information to the controller A 251 and the first short-range communication unit B 353 may transmit the link loss state information to the controller B 351 in operation 802.

When receiving the link loss state information from the first short-range communication unit A 253, the controller A 251 may transmit a BLE background link command along with address information of the second electronic device 300 with which the link loss occurs in the state where the link was established through the first short-range communication unit A 253 and a request for an RSSI value of the second electronic device to the second short-range communication unit A 255 in operation 803. When receiving the BLE background link command from the controller A 251, the second short-range communication unit A 255 may perform a scan operation of scanning for a broadcasted advertising packet in operation 804*a*.

When receiving the link loss state information from the first short-range communication unit B 353, the controller B 351 may transmit a broadcasting command for the advertising packet to the second short-range communication unit B 355 in operation 803. When receiving the broadcasting command for the advertising packet from the controller B 351, the second short-range communication unit B 355 may broadcast the advertising packet in operation 804*b*.

As the second short-range communication unit B 355 broadcasts the advertising packet, the second short-range communication unit A 255 may scan for the advertising packet broadcasted by the second short-range communication unit B 355 through the scan operation.

When the address information of the second electronic device 300 is detected in the scanned advertising packet in operation 805, the second short-range communication unit A 255 may make a request for the link for BLE communication corresponding to the second short-range communication to the second short-range communication unit B 355 in operation 806.

When a response to the link of the BLE communication is received from the second short-range communication unit B 355 in operation 807, the first electronic device 200 and the second electronic device 300 may have the link of the BLE communication corresponding to the second short-range communication through the second short-range communication unit A 255 and the second short-range communication unit B 355 in operation 808.

The second short-range communication unit A having the link of BLE communication corresponding to the second short-range communication with the second electronic device 300 may detect the RSSI value of the second electronic device 300 in operation 809 and perform operation 810 of transmitting the detected RSSI value to the controller A 251.

The controller A 251 having received the RSSI value of the second electronic device 300 from the second short-range communication unit A 255 may compare the RSSI value received from the second short-range communication unit A 255 with a preset reference RSSI value in operation 811. When the RSSI value received from the second short-range communication unit A 255 is larger than or equal to the preset reference RSSI value based on a result of the comparison, the controller A 251 may transmit a command for the link of the first short-range communication with the second electronic device 300 to the first short-range communication unit A 253 in operation 812.

When receiving the command for the link of the first short-range communication with the second electronic device 300 from the controller A 251, the first short-range communication unit A 253 may attempt paging for the link of the first short-range communication with the second electronic device 300. At this time, when the first short-range communication unit A 253 and the first short-range communication unit B 353 of the second electronic device 300, which performs the paging scan, are in synchronization, the link of the BT communication corresponding to the first short-range communication may be re-made between the first electronic device 200 and the second electronic device 300 through the first short-range communication unit A 253 and the first short-range communication unit B 353 in operation 813.

Although the above embodiments employ examples using the first short-range communication unit and the second short-range communication unit, schemes equal or similar to the principle and configuration of the embodiments may be used for communication between devices rather than the short-range communication.

The electronic device and the method of performing the communication link by the electronic device according to various embodiments of the present disclosure can be implemented by a computer-readable code stored in a computer-readable recording medium.

The computer readable recording medium includes all types of recording devices which store data readable by a computer system. As for such a recording medium, for example, a read-only memory (ROM), a random access memory (RAM), an optical disc, a magnetic tape, a floppy disc, a hard disc, or a non-volatile memory may be used, and a medium implemented in a type of carrier wave (e.g., transmission through an Internet) may also be included in such a recording medium. Further, the computer-readable recording medium may be dispersed in computer systems connected through a network, and a computer-readable code may be stored and executed in a dispersion scheme.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
    a short-range communication circuit to support a first short-range communication protocol and a second short-range communication protocol; and
    a processor adapted to:
        establish a first short-range communication connection between the portable communication device and an external electronic device according to the first short-range communication protocol,
        determine whether the first short-range communication connection is lost between the portable communication device and the external electronic device,
        obtain, according to the second short-range communication protocol, an advertising packet transmitted from the external electronic device based at least in part on a determination that the first short-range communication connection established according to the first short-range communication protocol is lost, the advertising packet including information corresponding to the external electronic device, and
        establish a second short-range communication connection between the portable communication device and the external electronic device according to the first short-range communication protocol using the information obtained according to the second short-range communication protocol.

2. The portable communication device of claim 1, wherein the processor is further adapted to:
    consume a first power when operated according to the first short-range communication protocol, and consume a second power less than the first power when operated according to the second short-range communication protocol.

3. The portable communication device of claim 1, wherein the first short-range communication protocol includes a Bluetooth protocol and the second short-range communication protocol includes a Bluetooth low energy protocol.

4. The portable communication device of claim 1, wherein the processor is further adapted to:
measure a received signal strength indication (RSSI) value corresponding to the external electronic device according to the second short-range communication protocol prior to the establishing of the first short-range communication connection, and
perform the establishing of the first short-range communication connection based at least in part on a determination that the RSSI value is larger than a reference RSSI value.

5. The portable communication device of claim 1, wherein the processor is further adapted to:
measure a received signal strength indication (RSSI) value corresponding to the external electronic device after the first short-range communication connection is lost, and
perform the establishing of the second short-range communication connection based at least in part on a determination that the RSSI value is larger than a reference RSSI value.

6. The portable communication device of claim 1, wherein the processor is further adapted to:
operate the portable communication device in a sleep state or a standby state after the first short-range communication connection is lost, and
perform the establishing of the second short-range communication connection while the portable communication device is in a corresponding one of the sleep state and the standby state.

7. The portable communication device of claim 1, wherein the processor is further adapted to:
establish a third short-range communication connection between the portable communication device and the external electronic device according to the second short-range communication protocol using the information prior to the establishing of the second short-range communication connection.

8. The portable communication device of claim 1, wherein the short-range communication circuit includes a first short-range communication module to support the first short-range communication protocol, and a second short-range communication module to support the second short-range communication protocol.

9. The portable communication device of claim 8, wherein the processor is further adapted to:
identify, using the first short-range communication module, that the first short-range communication connection is lost, and
provide the information to the second short-range communication module to be used by the second short-range communication module to establish a third short-range communication connection between the portable communication device and the external electronic device according to the second short-range communication protocol.

10. The portable communication device of claim 8, wherein the processor is further adapted to:
obtain, using the second short-range communication module, the information as at least part of an outcome of a scan operation.

11. A method comprising:
establishing, at a portable communication device, a first short-range communication connection between the portable communication device and an external electronic device according to a first short-range communication protocol supported by a short-range communication circuit operatively coupled with the portable communication device;
determining whether the first short-range communication connection is lost between the portable communication device and the external electronic device;
obtaining, via a second short-range communication protocol supported by the short-range communication circuit, an advertising packet transmitted from the external electronic device based at least in part on a determination that the first short-range communication connection established according to the first short-range communication protocol is lost, the advertising packet including information corresponding to the external electronic device; and
establishing a second short-range communication connection between the portable communication device and the external electronic device according to the first short-range communication protocol using the information obtained according to the second short-range communication protocol.

12. The method of claim 11, further comprising:
consuming a first power when operated according to the first short-range communication protocol, and consuming a second power less than the first power when operated according to the second short-range communication protocol.

13. The method of claim 11, wherein the establishing of the first short-range communication connection comprises:
measuring a received signal strength indication (RSSI) value corresponding to the external electronic device prior to the establishing of the first short-range communication connection; and
performing the establishing of the first short-range communication connection based at least in part on a determination that the RSSI value is larger than a reference RSSI value.

14. The method of claim 11, further comprising:
measuring a received signal strength indication (RSSI) value corresponding to the external electronic device after the first short-range communication connection is lost; and
performing the establishing of the second short-range communication connection based at least in part on a determination that the RSSI value is larger than a reference RSSI value.

15. The method of claim 11, further comprising:
operating the portable communication device in a sleep state or a standby state after the first short-range communication connection is lost; and
performing the establishing of the second short-range communication connection while the portable communication device is in a corresponding one of the sleep state and the standby state.

16. The method of claim 11, further comprising:
establishing a third short-range communication connection between the portable communication device and the external electronic device according to the second short-range communication protocol using the information prior to the establishing of the second short-range communication connection.

17. The method of claim 11, wherein the short-range communication circuit includes a first short-range communication module to support the first short-range communication protocol, and a second short-range communication module to support the second short-range communication protocol.

18. The method of claim 17, further comprising:
identifying, using the first short-range communication module, that the first short-range communication connection is lost; and
providing the information to the second short-range communication module to be used by the second short-range communication module to establish a third short-range communication connection between the portable communication device and the external electronic device according to the second short-range communication protocol.

19. The method of claim 17, further comprising:
receiving, from the second short-range communication module, information indicating that the information obtained by a scan operation; and
transmitting, to the first short-range communication module, a command to establish the second short-range communication connection between the portable communication device and the external electronic device.

20. A non-transitory machine-readable storage device storing instructions that, when executed by one or more processors, cause the one or more processors to perform operations comprising:
establishing, at a portable communication device, a first short-range communication connection between the portable communication device and an external electronic device according to a first short-range communication protocol supported by a short-range communication circuit operatively coupled with the portable communication device;
determining whether the first short-range communication connection is lost between the portable communication device and the external electronic device;
obtaining, via a second short-range communication protocol supported by the short-range communication circuit, an advertising packet transmitted from the external electronic device based at least in part on a determination that the first short-range communication connection established according to the first short-range communication protocol is lost, the advertising packet including information corresponding to the external electronic device; and
establishing a second short-range communication connection between the portable communication device and the external electronic device according to the first short-range communication protocol using the information obtained according to the second short-range communication protocol.

21. The portable communication device of claim 1, wherein the information corresponding to the external electronic device includes address information of the external electronic device.

22. The method of claim 11, wherein the information corresponding to the external electronic device includes address information of the external electronic device.

23. The non-transitory machine-readable storage device of claim 20, wherein the information corresponding to the external electronic device includes address information of the external electronic device.

* * * * *